United States Patent [19]

Feichtl et al.

[11] Patent Number: 4,655,664
[45] Date of Patent: Apr. 7, 1987

[54] SYSTEM FOR TRANSFERRING WORKPIECES BETWEEN PALLETS AND AT LEAST ONE MACHINE TOOL

[75] Inventors: Roland Feichtl, Linz; Walter Deisenhammer, Attnang-Puchheim, both of Austria; Eugen Rennstich, Güglingen, Fed. Rep. of Germany; Klaus Ganglberger, Traun, Austria

[73] Assignee: Voest-Alpine Aktiengesellschaft, Linz, Austria

[21] Appl. No.: 696,043

[22] Filed: Jan. 29, 1985

[30] Foreign Application Priority Data

Feb. 8, 1984 [AT] Austria ................................. 404/84
Jul. 6, 1984 [AT] Austria ............................... 2173/84

[51] Int. Cl.⁴ .......................... B65G 60/00; B66C 1/66
[52] U.S. Cl. ........................................ 414/32; 294/89; 414/102; 414/120; 414/225
[58] Field of Search ................... 294/89; 414/32, 101, 414/120, 102, 110, 222, 225, 286; 901/6

[56] References Cited

U.S. PATENT DOCUMENTS 3,429,607 2/1969 White ..................................... 294/89
4,541,762 9/1985 Tischler et al. ...................... 414/32
4,557,655 12/1985 Berg ..................................... 414/32

Primary Examiner—Robert J. Spar
Assistant Examiner—Janice Krizek
Attorney, Agent, or Firm—Kurt Kelman

[57] ABSTRACT

Workpieces to be machined by a machine tool are taken from pallets by a loader-unloader, which subsequently deposits the machined workpieces on pallets. To simplify the handling of the pallets and to reduce the nonproductive times, a pallet support is provided with a first stack station for supporting a stack of pallets carrying workpieces to be machined and with a second stack station for supporting a stack of pallets for receiving machined workpieces. The loader-unloader is operable to lift an empty pallet from the top of the first stack and to transfer said empty pallet to the second stack station.

2 Claims, 8 Drawing Figures

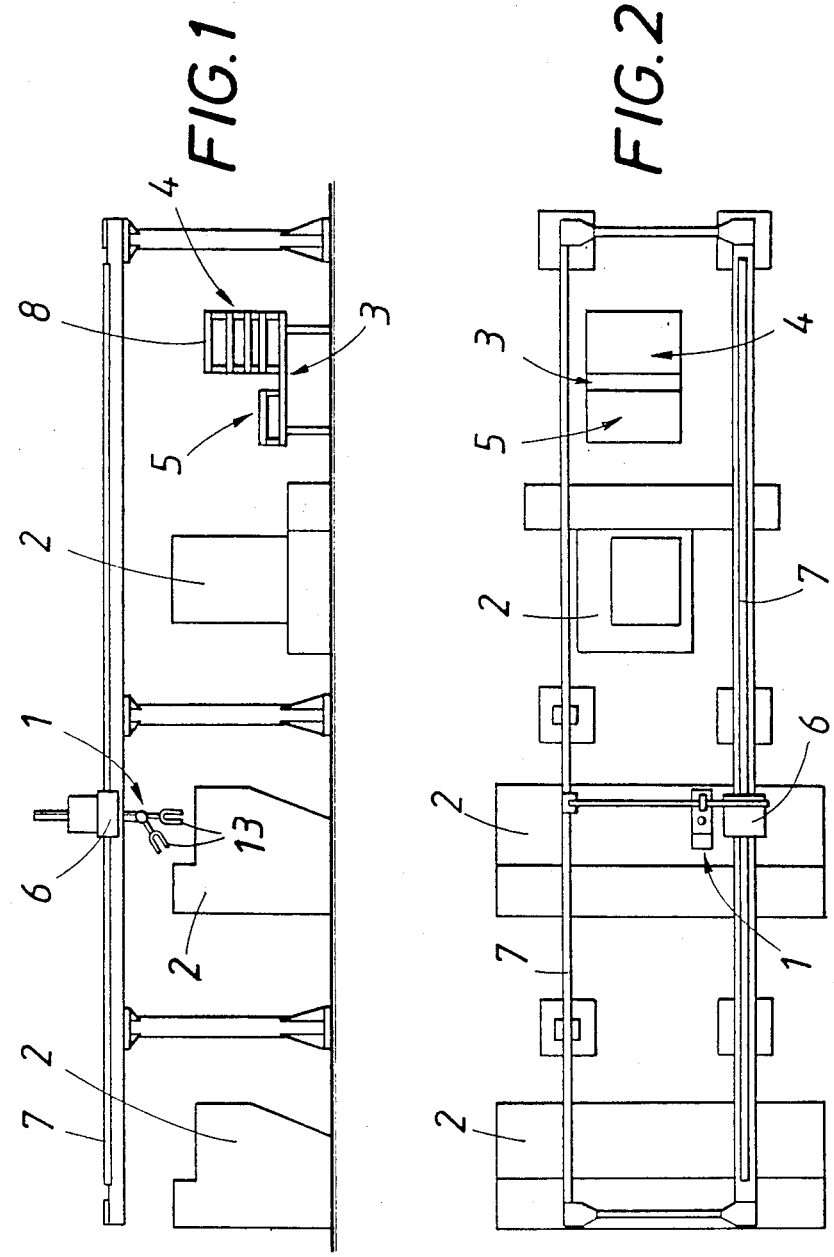

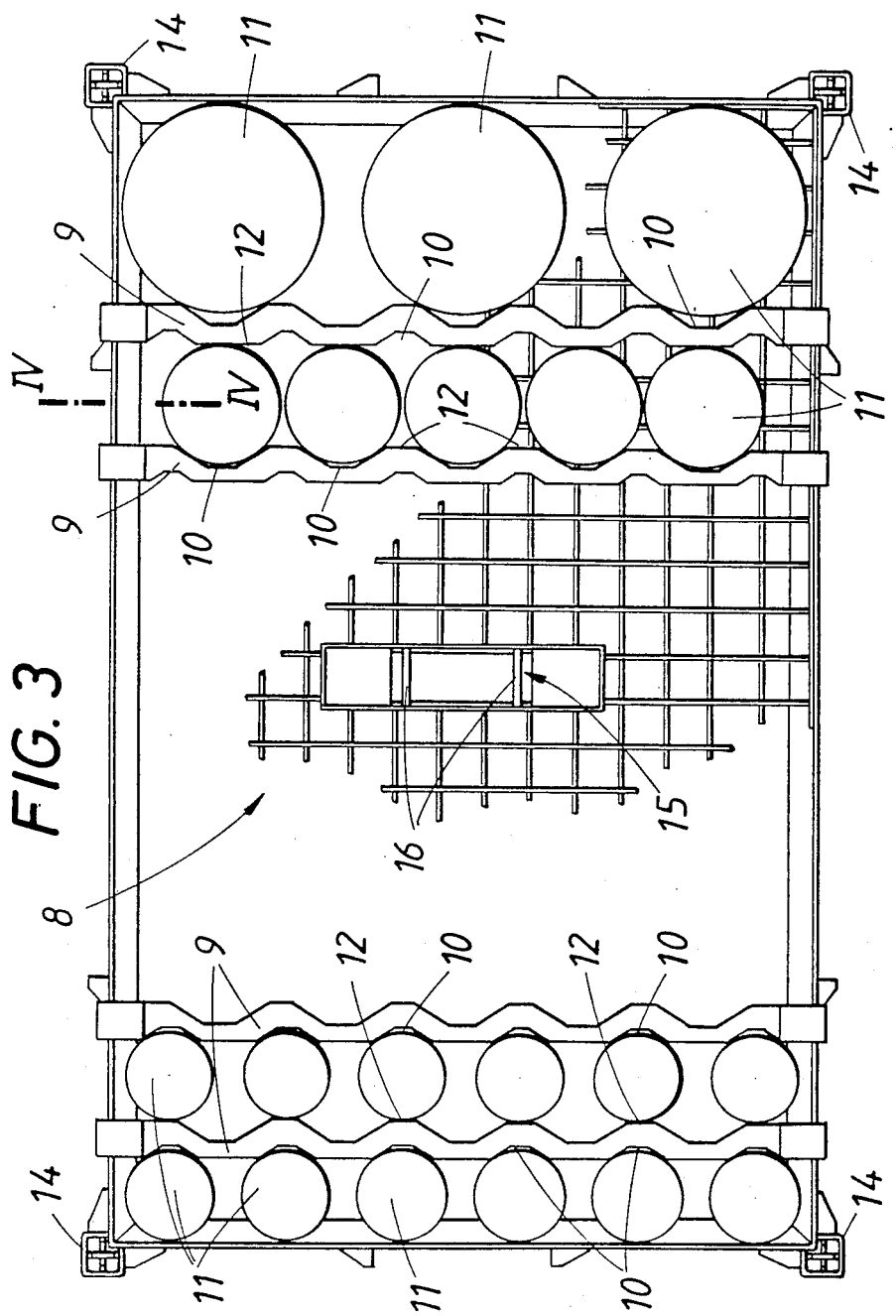

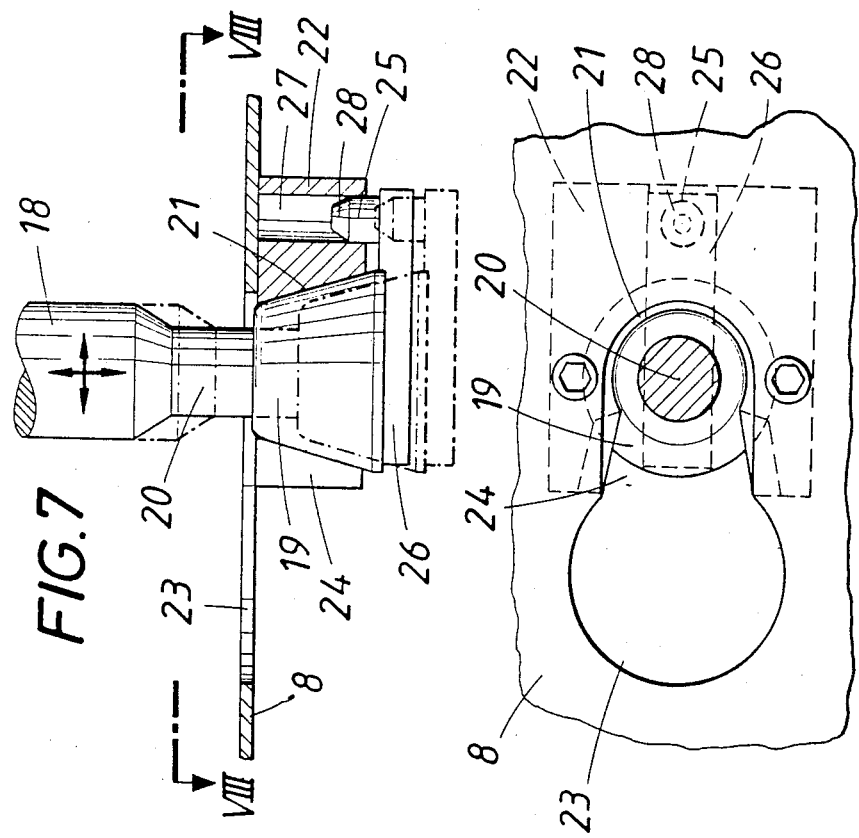
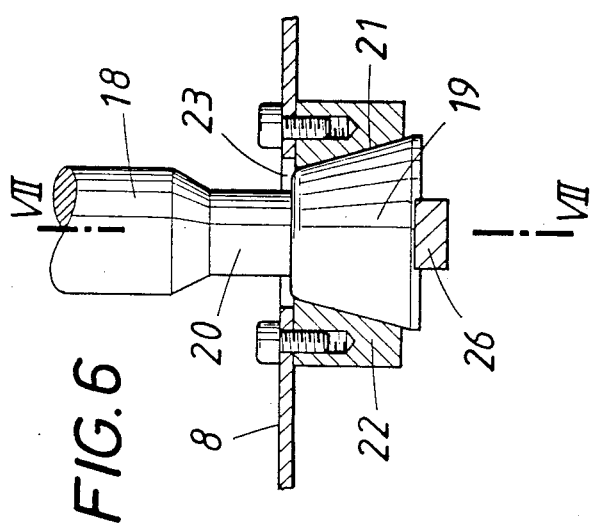
FIG.7
FIG.8
FIG.6

SYSTEM FOR TRANSFERRING WORKPIECES BETWEEN PALLETS AND AT LEAST ONE MACHINE TOOL

BACKGROUND OF THE INVENTION

1. Field of the Invention

This invention relates to a system for transferring workpieces between pallets and at least one machine tool by means of a loader-unloader, which is reciprocable between the machine tool and a pallet support and which takes workpieces to be machined from the pallets and deposits machined workpieces on the pallets.

2. Description of the Prior Art

It is known that the handling of workpieces to be machined and machined workpieces can be simplified in that the workpieces to be machined are placed on stackable pallets in such an orientation that each workpiece to be machined can be taken over by the loader-unloader and the machined workpieces are deposited on the pallets. Those pallets which are loaded with workpiece blanks are delivered one after the other to a support, which usually consists of a coordinate deck so that each workpiece blank can be moved by a displacement of the pallet to a specific transfer position, in which the blank is taken over by the loader-unloader, which subsequently transfers the workpiece blank to the machine tool. The workpiece which has been machined is again placed in its previous position on the pallet and the latter is then displaced by means of the coordinate deck until the loader-unloader can take over the next workpiece blank. A disadvantage of said known systems resides in that a separate conveyor is required to place the laden pallets onto the coordinate deck. Besides, a relatively long nonproductive time is involved in the movement of the pallets between the position in which a machined workpiece is deposited and the position in which a workpiece blank is taken over by the loader-unloader.

SUMMARY OF THE INVENTION

It is an object of the invention to avoid these disadvantages and so to improve a system of the kind described first hereinbefore that the movement of the pallets between the position in which the workpiece blanks are taken over by the loader-unloader and the position in which the machined workpieces are deposited on the pallets by the loader-unloader can be simplified and performed during shorter nonproductive times and that this can be achieved with a low cost structure.

This object is accomplished in accordance with the invention with a pallet support which comprises two stack stations for respectively supporting a first stack of pallets for carrying workpieces to be machined and a second stack of pallets for receiving machined workpieces, and a loader-unloader operable to lift each pallet and to transfer a pallet from the top of the first stack to the second stack station when said pallet at the top of the first stack is empty because all workpieces have been removed from it.

Owing to the provision of two stack stations for supporting respective stacks of pallets, no nonproductive times are required for a displacement of the pallets because each machined workpiece need no longer be returned to a pallet which carries workpiece blanks. As a result, the workpieces to be machined are removed one after the other by the loader-unloader from that pallet which is at the top of the stack of pallets carrying the workpieces to be machined and the machined workpieces are deposited by the loader-unloader on the uppermost pallet of the stack of pallets for machined workpieces. When the uppermost pallet of the first stack has been entirely unloaded, the loader-unloader can be operated to lift said uppermost pallet from the first stack and to deposit said now empty pallet on the second stack because the empty pallet has a weight of the order of the workpiece weight for which the loader-unloader is designed. As a result, a separate conveyor for handling each pallet is not required.

When an empty pallet has been placed onto the second stack, the workpiece blanks taken from the now uppermost pallet of the first stack can be supplied one after the other to the machine tool by the loader-unloader and when said workpieces have been machined they can be deposited by the loader-unloader on the initially empty uppermost pallet of the second stack. When all workpieces initially carried by the pallets have been machined, the second stack of pallets carrying machined workpieces is carried away, e.g., by means of a lift truck, and a new first stack of pallets carrying workpiece blanks is supplied to the first stack station. In that case the lowermost empty pallet of the previous first stack may be transferred to the second stack station as the lowermost pallet of the subsequently formed new second stack.

To eliminate the need for an additional conveyor, the loader-unloader must be operable to lift each pallet. For this purpose the loader-unloader may comprise a pallet gripper for gripping each empty pallet of the first stack. Such gripper may be designed to match the design of the pallets in such a manner that a positive coupling between the gripper and each pallet gripped by the gripper will always be ensured; such positive coupling is required for a deposition of each pallet in the proper orientation. On the other hand, the provision of the loader-unloader with a pallet gripper which is designed to match the design of the pallets will restrict the space which is available for the workpiece grippers. In order to avoid such restriction, the pallet gripper may be adapted to be replaced by a workpiece gripper so that the loader-unloader will be adapted to perform the desired operation. As grippers can be automatically replaced and such replacement is required only when all workpiece blanks carried by a pallet of the first stack have been machined, the replacement of the grippers does not involve significantly long nonproductive times.

Particularly simple conditions will be obtained if the pallet gripper consists of a workpiece gripper and each pallet has an extension adapted to be gripped by said gripper. In that case the gripper is not adapted to the pallets but each pallet is adapted to the gripper so that there is no need for separate pallet grippers and particularly favorable conditions are obtained. The usual grippers used in loaders-unloaders for machine tools comprise gripping jaws or gripping fingers. If the grippable extension of each pallet comprises at least one gripping lug disposed adjacent to the center of gravity of the pallet, the gripper will be able to positively grip each pallet and there will be no or only slight weight-induced torques because the grippable extension is disposed near the center of gravity of the pallet.

To ensure that the pallets can be gripped by internal and by external grippers, each pallet may be provided with two spaced apart parallel grippable lugs, which can be gripped on their outside surfaces by external grippers whereas internal grippers can extend between the grippable lugs.

But the operation of the loader-unloader to lift each pallet does not depend on the presence of a pallet gripper. For instance, a pallet lifter, such as a lifting fork, may be provided, which is adapted to be gripped by the workpiece gripper. The provision of such a pallet lifter will eliminate the need for adapting the loader-unloader and the pallets to each other because that adaptation is achieved by the pallet lifter.

To eliminate the need for movable grippers for gripping each pallet and to ensure that each pallet can be gripped without a backlash, the loader-unloader may comprise a lifting arm which is vertical at least in an operating position and which at its lower end comprises a pallet-carrying head, which depends and flares conically from a neck portion of said arm, each pallet is formed with a socket opening, which tapers upwardly to match the conicity of the pallet-carrying head, and with a through opening, which is spaced apart from the socket opening and adapted to receive the pallet-carrying head, and the through opening and the socket opening communicate with each other through a slot which has a width that is larger than the diameter of the neck portion of the lifting arm. When the downwardly flaring pallet-carrying head is disposed under the socket opening of a pallet, which socket opening conforms to the pallet-carrying head, and the lifting arm is then raised the pallet-carrying head will positively engage the socket opening without backlash so that the loader-unloader can be operated to transfer a pallet by means of the lifting arm from the top of the first stack to the top of the second stack. To ensure that the pallet-carrying head can be introduced into the upwardly tapering socket opening, a through opening is required, which communicates through a slot with the socket opening so that the pallet-carrying head can be moved through said through opening to the underside of the pallet and the neck portion of the lifting arm can subsequently be laterally moved through the slot into the socket opening. When the lifting arm is then raised, it will be automatically coupled positively to the pallet so that no movable gripping fingers are required on the lifting arm.

In order to ensure that the angular position of the pallet with respect to the axis of the pallet-carrying head is determined not only by the frictional forces between the pallet-carrying head and the surface of the socket opening, the cross-sectional shapes of the pallet-carrying head and of the socket opening of the pallet might be non-circular. But the manufacture of such parts which deviate from the shape of a solid of revolution is expensive. For this reason the pallet-carrying head is preferably provided near its lower end face with a radial arm, which carries a locking pin that is parallel to the axis of the lifting arm, and each pallet is provided adjacent to the socket opening with a pin-receiving opening for receiving said locking pin. As the pallet-carrying head is coupled to the pallet, the locking pin enters the pin-receiving opening to positively hold the pallet in the proper angular position relative to the pallet-carrying head. In that case the pallet-carrying head and the socket opening of the pallet may be conical. On the other hand, a conical shape of the pin-receiving opening is neither required nor desired. The movement of the locking pin into the cylindrical pin-receiving opening can be facilitated in that the free end of the locking pin is conically tapered.

BRIEF DESCRIPTION OF THE DRAWING

FIG. 1 is a diagrammatic side elevation showing a system in accordance with the invention for transferring workpieces between pallets and machine tools.

FIG. 2 is a top plan view showing that system.

FIG. 3 is an enlarged top plan view showing a pallet for carrying workpieces to be machined.

FIG. 6 is a diagrammatic vertical sectional view showing a lifting arm of the loader-unloader, which lifting arm is positively coupled to a pallet.

FIG. 7 is a sectional view taken on line VII—VII of FIG. 6 and

FIG. 8 is a sectional view taken on line VIII—VIII of FIG. 7.

DETAILED DESCRIPTION OF THE PREFERRED EMBODIMENT

Figure 4:
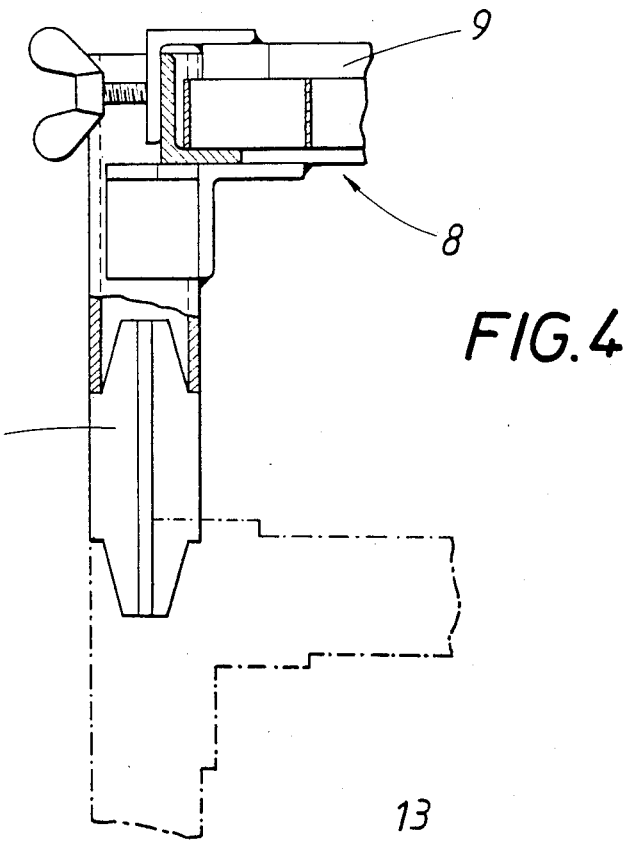
FIG. 4 is a further enlarged sectional view taken on line IV—IV in FIG. 3.

Embodiments of the invention are shown by way of example on the drawings.

As is apparent from FIGS. 1 and 2, the system in accordance with the invention comprises a loader-unloader 1 associated with three machine tools 2 and a pallet support 3 having first and second stack stations for supporting first and second pallet stacks 4 and 5, respectively. The loader-unloader 1 is reciprocable between the machine tools 2 and the pallet support 3. For this purpose the loader-unloader is mounted on a portal carriage 6, which is slidable along two longitudinal rails 7. Because the loader-unloader 1 is movable on the portal carriage 6 transversely to the rails 7, the loader-unloader 1 can be moved to any desired position within an area determined by the two longitudinal rails 7.

The workpieces to be machined are placed on stackable pallets 8 in such an orientation that the workpieces can be taken over from each pallet 8 by the loader-unloader 1. For this purpose, each pallet 8 comprises aligning bars 9, which are shown in FIG. 3 and have obtuse-angled recesses 10 for receiving and centering circularly cylindrical workpieces 11. Each of said recesses 10 registers with a straight section 12 of the adjacent aligning bars 9 so that the workpieces 11 are retained on the pallets 8 in a proper orientation and can be gripped by grippers 13 of the loader-unloader 1.

The workpieces 11 to be machined are placed on each pallet 8 between the aligning bars 9, which are adjustable and adapted to be clamped in their adjusted position. When the pallets 8 have thus been loaded, they are stacked to form a first stack 4. The pallets are held together in the stack by means of plug feet 14, which depend from each pallet 8 and are received by the hollow plug feet 14 of the next lower pallet 8 in the stack. The first stack 4 of pallets loaded with workpieces to be machined is placed on the associated first stack station of the pallet support 3, which in said first stack station is provided with openings for receiving the plug feet 14. The loader-unloader 1 can now grip the workpieces 11 on the pallets 8 one after the other and can supply said workpieces to the machine tools 2. The workpieces which have been machined are deposited on an empty pallet, which has been placed on the support in the second stack station for supporting the second stack 5 of pallets carrying machined workpieces. This sequence of operations is repeated until the uppermost pallet 8 of the first stack 4 of pallets carrying workpieces to be machined has been entirely unloaded. The unloaded pallet 8 is then transferred on top of the pallet which is disposed in the second stack station and has previously been loaded with machined workpieces. That transfer is effected by means of the loader-elevator 1, which is operable to lift each pallet. For this purpose each pallet 8 is provided with a grippable extension 15, which in accordance with FIG. 3 consists of two parallel grippable lugs 16, which are disposed at or near the center of gravity of the pallet. Said grippable lugs 16 can be gripped by an internal gripper and by an external gripper so that the use of such pallets will be substantially independent of the design of the grippers 13 of the loader-unloader 1. Because the grippable bars 16 are disposed adjacent to the center of gravity of the pallet 8, there will be no substantial weight-induced torques during the transfer of the empty pallets 8 by the loader-unloader so that there is no need for special measures for ensuring a positive coupling between the loader-unloader 1 and the pallet 8 being transferred.

When the empty pallet 8 from the first stack 4 has been placed on the second stack 5, the workpieces on the now uppermost pallet of the first stack 4 are accessible and the initially empty pallet which has been transferred to the second stack 5 is available for receiving machined workpieces. When all workpieces from all pallets 8 of the first stack 4 have been machined and have been placed on the second stack 5, the latter can be carried off by means of a lift truck and a new stack of pallets carrying workpieces to be machined can be placed on the pallet support 3 in the first stack station.

Figure 5:
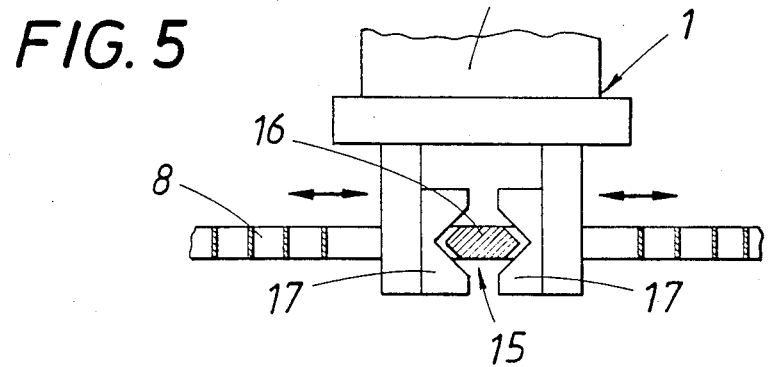
FIG. 5 is a simplified sectional view showing a pallet having an extension which is adapted to be gripped by a gripper of a loader-unloader.

In the embodiment shown in FIG. 5, the grippable extension 15 of each pallet 8 consists only of single grippable lug 16. Such pallets can be used only in systems in which the loader-unloader comprises external grippers. The gripping jaws 17 of such grippers 13 engage the grippable lug 16 of each pallet 8 on both sides and transfer the pallet from the first stack 4 to the second stack 5. The loader-unloader can be controlled in a simple manner because only the conventional movements must be performed as the grippers 13 are vertically moved and the loader-unloader is moved on the portal carriage 6 and the latter is moved along the rails 7.

In accordance with FIGS. 6 to 8 the loader-unloader 1 comprises a lifting arm 18 having in its lower end portion a neck 20 and a pallet-carrying head 19, which depends from the neck 20 and flares downwardly in conical shape. By means of the loader-unloader, the lifting arm 18 with its pallet-carrying head 19 can be moved in vertical and horizontal directions. Each pallet 8 is formed with an open-bottomed socket opening 21, which tapers upwardly in a conical shape conforming to that of the pallet-carrying head 19 and is adapted to receive the latter. That socket opening 21 is defined by a carrying member 22, which is mounted on the underside of the pallet adjacent to the center of gravity of the pallet. As the pallet-carrying head 19 can be inserted into the socket opening 21 only from below, the pallet-carrying head 19 must initially be moved to the underside of the pallet 8 through a through opening 23, which is formed in the pallet 8 and is laterally spaced from the socket opening 21 and communicates with the socket opening 21 through a slot 24, which extends through the pallet and which is sufficiently wide to receive the neck portion 20 of the lifting arm 18, so that the pallet-carrying head 19 can be moved from a position under the through opening 23 to a position under the socket opening 21. When the pallet-carrying head 19 is disposed under the socket opening 21, as is indicated in phantom in FIG. 7, the pallet-carrying head 19 can be lifted to be positively coupled to the pallet 8 in its socket opening 21 and the pallet can then be transferred by means of the lifting arm 18 from the first stack 4 to the second stack 5.

A radial arm 26 is secured to the pallet-carrying head 19 near the lower end face thereof and carries a locking pin 25 for holding the pallet 8 in position relative to the lifting arm 18. As the pallet-carrying head 19 is coupled to the pallet 8, that locking pin enters a cylindrical pin-receiving opening 27 formed in the carrying member 22. The locking pin 25 now holds the pallet 8 against rotation relative to the pallet-carrying head 19. To facilitate the insertion of the locking pin 25 into the pin-receiving opening 27, the locking pin 25 may be conically tapered at its free end 28.

We claim:

1. A system for transferring workpieces between pallets and at least one machine tool, each pallet having an open-bottomed, upwardly tapering, conical socket opening, a through opening laterally spaced from said socket opening, and a slot extending through said pallet and opening into said socket and through openings, the pallets being formed with a pin-receiving opening adjacent to and eccentric with respect to said socket opening, and being adapted to carry workpieces to be machined and machined workpieces, which comprises:

a pallet support adapted to support the pallets and including a first station for supporting a first stack consisting of pallets carrying workpieces to be machined, and a second station for supporting a second stack consisting of pallets carrying machined workpieces, and a loader-unloader for transferring workpieces to be machined from pallets on said pallet support to said one machine tool and for transferring machined workpieces from said one machine tool to pallets on said pallet support, said loader-unloader is operable to lift each of said pallets and to transfer an empty pallet from the top of said first stack in said first station to said second station, and said loader-unloader includes a lifting arm adapted to assume a vertical position and having a lower end portion comprising a neck, which is narrower than said slot, and an upwardly-tapering, conical pallet-carrying head depending from said neck, said pallet-carrying head being adapted to be moved through said through hole of each of said pallets to the underside thereof and to enter said socket opening from below, said pallet-carrying head having a radial arm adjacent a lower end thereof and carrying a locking pin that is parallel to an axis of said neck of said lifting arm and adapted to enter into said pin-receiving opening to non-rotatably connect said pallet to said pallet-carrying head.

2. The system set forth in claim 1, wherein said locking pin is conically tapered at its free end.

* * * * *